United States Patent
Rapp

[15] 3,668,163

[45] June 6, 1972

[54] EMULSIONS OF WATER IN HALOGENATED SOLVENTS WHICH CONTAIN FLUORINATED OIL AND WATER REPELLENTS

[72] Inventor: Theodore Clyde Rapp, Newark, Del.

[73] Assignee: E. I. du Pont de Nemours and Company, Wilmington, Del.

[22] Filed: Aug. 5, 1969

[21] Appl. No.: 847,737

[52] U.S. Cl. ...................260/28.5 D, 117/138.5, 260/29.6 F, 260/29.6 WQ
[51] Int. Cl. ................C08f 45/52, C08f 45/30, D06m 11/00
[58] Field of Search.........260/28.5 D, 29.6 WQ, 853, 29.6 F; 117/138.5

[56] References Cited
UNITED STATES PATENTS

| | | | |
|---|---|---|---|
| 2,663,696 | 12/1953 | Armatys | 260/29.6 WO |
| 3,093,602 | 6/1963 | Booth et al. | 260/29.6 WO |
| 3,219,607 | 11/1965 | Perronin | 260/29.6 WO |
| 3,378,609 | 4/1968 | Fasick | 260/890 |
| 3,459,696 | 8/1969 | Read | 260/853 |
| 3,480,579 | 11/1969 | Raynolds | 117/135.5 |

*Primary Examiner*—Morris Liebman
*Assistant Examiner*—S. L. Fox
*Attorney*—Gary A. Samuels

[57] ABSTRACT

A water-in-oil emulsion comprising a chlorinated alkane solvent having contained therein in emulsified form an aqueous dispersion of a fluorinated oil- and water-repellent polymeric composition, wax, a melamine derivative, and a mixture of selected sulfonates.

10 Claims, No Drawings

EMULSIONS OF WATER IN HALOGENATED SOLVENTS WHICH CONTAIN FLUORINATED OIL AND WATER REPELLENTS

BACKGROUND OF THE INVENTION

1. Field of the Invention

This invention relates to new oil- and water-repellent compositions, and more particularly to water-in-oil emulsions containing fluorinated oil- and water-repellent polymers and to the treatment of fabrics with such emulsions.

2. Description of the Prior Art

Aqueous dispersions containing fluorinated oil- and water-repellent polymers, e.g., polymers of $CH_2=C(CH_3)CO_2CH_2CH_2(CF_2)_nF$, have been employed to deposit the oil- and water-repellent polymers on fabrics to impart oil and water repellency thereto. Ordinarily the fabric is subjected to an aqueous pad bath containing the aqueous dispersions.

More recently, processes have been developed for applying oil and water repellents to fabrics from organic solvent solutions, as for example, simultaneously with the dry cleaning of fabrics. In such instances it is desirable to use one common organic solvent for dry cleaning and for applying the oil and water repellent. In addition, processes have been developed for applying oil and water repellents to fabrics from aerosol containers and it is advantageous to use repellents that are soluble in organic propellants. However, fluorinated oil- and water-repellent polymers, such as the ones described above, dissolve only to a slight extent in organic solvents, especially halogenated organic solvents and the art has become increasingly concerned with developing formulations of such fluorinated oil- and water-repellent polymers that will dissolve in organic solvents.

Due to the cost of organic solvents and because higher concentrations of fluorinated oil- and water-repellent polymers can be obtained in aqueous dispersions than in organic solvents, per se, it would be desirable to provide a formulation of such fluorinated oil- and water-repellent polymers which contained sufficient water to gain the advantages of lower cost and greater concentration of the oil and water repellent and which contained sufficient organic solvent to enable the formulation to be employed in the processes described above for treating fabrics with organic solvent solutions. Accordingly, it is an object of this invention to provide such a formulation.

SUMMARY OF THE INVENTION

A water-in-oil emulsion comprising

I. a major amount by weight of a chlorinated alkane solvent containing one or two carbon atoms, said solvent having dispersed therein in emulsified form II. from about one to about ten parts by weight of an aqueous dispersion containing about 10 percent to about 25 percent by weight solids, which solids comprise a fluorinated polymeric composition selected from a. a fluorinated copolymer consisting essentially of about 25 percent to about 98 percent by weight of units derived from at least one polymerizable fluoromonomer of the structure $CH_2=C(CH_3)CO_2CH_2CH_2(CF_2)_nF$ wherein $n$ is an integer of from 3 to 14, and about 75 percent to about 2 percent by weight of units derived from at least one polymerizable nonhalogenated acrylate or methacrylate ester; or b. a polymeric mixture consisting essentially of about 40 percent to about 80 percent by weight of the fluorinated copolymer defined in part I(a) and about 60 percent to about 20 percent by weight of a polymer consisting essentially of units derived from at least one polymerizable nonhalogenated acrylate or methacrylate ester;

III. from about one to about ten parts by weight of an aqueous dispersion containing about 20 percent to about 30 percent by weight solids, which solids comprise a composition consisting essentially of about 20 percent to about 50 percent by weight wax and about 80 percent to about 50 percent by weight of a melamine derivative comprising the reaction product obtained by treating hexamethylolmelamine with (a) a lower alkyl alcohol in a mineral acid, followed by a $C_{12}$ to $C_{22}$ aliphatic carboxylic acid, or with (b) stearic acid followed by triethanolamine; and IV. from about one-half to about two parts of an aqueous composition containing about 50 percent to about 75 percent by weight of a sulfonate selected from (a) alkyl ($C_{12}$—$C_{18}$) benzene sulfonate salts, or (b) the sulfonate salts of a mixture of $C_{16}$—$C_{25}$ branched chain hydrocarbons in which the mixture predominates in secondary sulfonates.

DESCRIPTION OF THE INVENTION

I. The aqueous dispersion of a fluorinated polymeric composition.

This composition comprises either the fluorinated copolymer described above dispersed in water or a mixture of the copolymer described above with a polymer of a nonhalogenated acrylate or methacrylate dispersed in water.

The fluorinated copolymer comprises units derived from about 25—98 percent (preferably 60—98 percent) by weight of at least one fluorinated monomer of the formula $CH_2=C(CH_3)CO_2CH_2CH_2(CF_2)_nF$ where $n$ is a numeral of 3—14, and 75—2 percent (preferably 40—2 percent) by weight of at least one polymerizable nonhalogenated acrylate or methacrylate monomer. Preferably the fluorinated monomer component is a mixture of such monomers in which $n$ represents the numbers 6, 8 and 10 in the approximate weight ratio of 3:2:1, and 12 and 14 in a combined amount of less than 10 percent of the total weight of the fluorinated monomers. The polymerizable nonhalogenated acrylate or methacrylate ester monomers include $C_1$—$C_{20}$ alkyl acrylates and methacrylates, such as methyl-, propyl, butyl-, isoamyl-, 2-ethylhexyl-, octyl-, octadecyl-, lauryl- acrylate and methacrylate and the like; hydroxy substituted ($C_1$—$C_{20}$) alkyl acrylates and methacrylates, such as 2-hydroxyethyl acrylate or methacrylate; ($C_1$—$C_{10}$)-acrylamides, such as N-methylol acrylamide or methacrylamide; ($C_1$—$C_{10}$) epoxy acrylates or methacrylates, such as glycidyl acrylate or methacrylate; and the like.

The fluorinated copolymer described in the preceding paragraph can be mixed with another polymer which comprises units derived from at least one polymerizable nonhalogenated acrylate or methacrylate in which the monomers making up this nonfluorinated polymer include the classes listed in the preceding paragraph in describing the nonhalogenated acrylate or methacrylate employed therein. Diacrylates or dimethacrylates can also be employed as monomer components in the nonfluorinated polymer, e.g., ethylene dimethacrylate. Preferably, this second polymer will be comprised of units derived from major (over 50 percent by weight) amounts of 2-ethylhexyl methacrylate and minor amounts of N-methylolacrylamide or ethylene dimethacrylate.

The fluorinated copolymer and the nonfluorinated polymer, when employed, are formed by separate polymerizations, generally by aqueous emulsion polymerization techniques. The resulting polymeric aqueous dispersions are then mixed together in the desired proportions. In general, the polymerization process will be carried out in a reaction vessel fitted with a stirrer and external means of either heating or cooling the charge. The monomer, or monomers, to be polymerized are emulsified in a water solution of a surface-active agent to a given emulsion concentration of from about 5 percent to about 50 percent. Usually, the temperature is raised to between 40° C. and 70° C. to effect polymerization in the presence of an added catalyst. A suitable catalyst may be any one of the commonly known polymerization catalysts, e.g., azodiisobutyramidine hydrochloride. Such preparations are described more fully in U.S. Pat. No. 3,378,609 in, e.g., Example VII thereof.

Representative copolymer and nonfluorinated second polymer compositions are listed in Table I following, in columns I-XII. A list of components appears at the left-hand side of the Table. The columns designated A indicate the components and amounts in parts thereof present in the fluorinated copolymer; while the columns designated B indicate the components and amounts in parts thereof present in the nonfluorinated polymer. If no numbers are present under columns A and B, the component or polymer is not present. The row titled "% of solids in emulsion" shows the percent of the polymer A and B, if present, making up the solids portion of the emulsion prepared.

Preferably, in the fluorinated copolymer, the percent by weight of units present due to the fluorinated monomer will range between 60 and 98 percent, while the units derived from the nonfluorinated monomer will range between 40 and 2 percent. Preferably also in the fluorinated copolymer, the units derived from nonfluorinated monomers will be derived from a mixture of N-methylolacrylamide and/or 2-hydroxyethyl methacrylate, each in an amount of about 0.25 percent by weight; and n-butyl- or laurylmethacrylate in an amount sufficient to make 100 percent.

The nonfluorinated polymer will preferably be composed of a major amount of 2-ethylhexyl methacrylate (50—99.5 percent) and minor amounts of N-methylolacrylamide or ethylene dimethacrylate.

II. The aqueous dispersion of wax and melamine derivative.

The wax and melamine composition is added to the emulsion of this invention to enhance the water-repellent properties of the emulsion.

The melamine derivatives are prepared from hexamethylolmelamine which itself is prepared by reacting melamine with formaldehyde. One class of melamine derivatives useful in the emulsion of this invention is prepared by reacting hexamethylolmelamine with a lower alkyl alcohol such that a portion or all of the hydroxyl groups on the melamine are etherified, and then reacting the etherified melamine with at least one long chain aliphatic carboxylic acid until the remaining hydroxyl groups are esterified. These procedures are described in detail in U.S. Pat. No. 2,835,639; British Pat. No. 611,012; and U.S. application Ser. No. 470,567, now U.S. Pat. No. 3,480,579, especially Example 1 thereof. The final product is represented by the structure

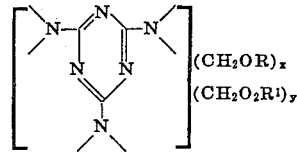

wherein R is alkyl of 1—6 carbon atoms (lower alkyl), $R^1$ is aliphatic hydrocarbon of 12 to 22 carbon atoms, $y$ is an integer of from 2 to 5, $x + y$ equals 6, and $x$ is integer equal to 6—$y$. Lower alkyl alcohols which can be employed include methanol, ethanol, propanol, butanol, pentanol and hexanol; preferably it is methanol ($R=CH_3$ in the formula above). Representative long-chain aliphatic carboxylic acids include lauric, tridecyclic, myristic, palmitic, margaric, stearic, behenic, oleic, tetradecenoic, hypogalic, linoleic, erucic, brossidic, elaidic, and the like. The saturated aliphatic acids are preferred, especially stearic or behenic acid.

A preferred such melamine derivative is obtained by reacting one mole of hexamethoxy methylmelamine with three moles of behenic acid.

Another class of melamine derivatives useful in the emulsion of this invention is prepared by reacting hexamethylolmelamine with two moles stearic acid and one mole triethanolamine as described in U.S. Pat. No. 2,783,231 in Example 1 thereof. (This product can be obtained commercially as "Phobotex" f/t/c.)

The preferred wax is paraffin wax.

The wax and melamine derivative are mixed together and homogenized in an aqueous system with a small amount of a long-chain amine acetate as described more fully in said U.S. application Ser. No. 470,567, now U.S. Pat. No. 3,480,579, in Example 3 thereof. Preferably, the amount of wax in the solids portion of the wax and melamine aqueous dispersion will usually range between about 20 and 50 percent, while the

TABLE 1

| | I | | II | | III | | IV | | V | | | VI | VII | | VIII | | IX | X | XI | XII |
|---|---|---|---|---|---|---|---|---|---|---|---|---|---|---|---|---|---|---|---|---|
| | A | B | A | B | A | B | A | B | A1 | B | A2 | A1 | A | B | A | B | A | A | A | A |
| Fluoromonomer, parts | 98 | | 65 | | 65 | | 65 | | 85 | | 65 | 98 | 75 | | 75 | | 65 | 85 | 75 | 65 |
| n-Butyl acrylate, parts | 2 | | | | | | | | | | | 2 | | | | | | | | |
| n-Methylolacrylamide, parts | 0.5 | 0.5 | 0.25 | 0.54 | 0.25 | 0.5 | 0.25 | 0.5 | 0.25 | 0.5 | 0.25 | 0.5 | 0.25 | 0.54 | 0.25 | 0.54 | 0.25 | 0.25 | 0.25 | 0.25 |
| 2-ethylhexyl methacrylate, parts | | 99.5 | | 99.5 | | 99.5 | | 99.5 | 15 | 99.5 | | | 25 | 99.5 | 25 | 99.5 | | 15 | 25 | |
| Lauryl methacrylate, parts | | | | | 35 | | 35 | | | | 35 | | | | | | 35 | | | 35 |
| Ethylene dimethacrylate, parts | | | | 0.134 | | | | | | | | | | 0.134 | | 0.134 | | | | |
| 2-hydroxyethyl methacrylate, parts | | | | | | | 0.25 | | 0.25 | | 0.25 | | 0.25 | | 0.25 | | | 0.25 | 0.25 | |
| Percent of solids in emulsion | 6.4 | 8.1 | 9.46 | 5.97 | 9.46 | 5.97 | 8.31 | 5.19 | 3.65 | 6.49 | 5.50 | 5.8 | 8.28 | 4.14 | 8.25 | 6.03 | 25 | 24 | 25.0 | 25 | amount of melamine derivative will range between 80 and 50 percent. When the melamine derivative is the one prepared from hexamethoxy methylmelamine and a long-chain aliphatic carboxylic acid, the preferred weight ratio of wax to melamine derivative is about 1:1.

One preferred wax/melamine derivative combination contains about 25 percent by weight paraffin wax mixed with acetic acid salt of the condensation product of hexamethylolmelamine, 2 moles of stearic acid and 1 mole of triethanolamine. Another preferred such combination contains about 46 percent by weight paraffin wax, 46 percent by weight of the reaction product of hexamethoxymethylmelamine with 3 moles of behenic acid, and about 4 percent by weight each of dimethyloctadecylamine and dimethyltetradecylamine.

III. The aqueous composition of sulfonates.

The sulfonates employed in the emulsion of this invention act as the emulsifying agent. One class of sulfonates useful herein is the alkylbenzene sulfonate salts wherein the alkyl group contains 12—18 carbon atoms. Representative alkyl groups in such sulfonates include dodecyl, tetradecyl, octadecyl, and the like.

Another class of sulfonates useful herein is the sulfonates obtained by treating a mixture of branched chain hydrocarbons of 16—25 carbon atoms, and preferably being aliphatically saturated, viz., branched alkanes, in the fluid state with sulfur dioxide and chlorine at a temperature about 5°–15° C. above the melting point of the hydrocarbon mixture and under the influence of light until from 10 to 50 percent of the hydrocarbon mixture has been converted into the corresponding sulfonyl chloride derivatives, followed by treatment with alkali to obtain the final sodium sulfonate product. These procedures are described in greater detail in U.S. Pat. No. 2,334,764. The product obtained, preferably the sodium salt, is ordinarily a paste which can be diluted with the desired amount of water to obtain the aqueous compositions described herein.

IV. The emulsion.

The emulsions of this invention are prepared by mixing the components together in the proportions desired. Care must be taken, however, to add the aqueous composition of the sulfonate to the chlorinated alkane solvent prior to adding the remaining ingredients of the emulsion. After the sulfonate composition and the chlorinated alkane are well mixed, the aqueous dispersions of the fluorinated polymeric composition and the wax-melamine derivative may be added in any order.

Representative chlorinated alkane solvents employed in the emulsions of this invention include methyl chloroform, trichloroethylene, perchloroethylene, and the like.

Preferably, at least 50 percent, and most preferably about 89 to about 96.75 percent by weight of the total weight of the emulsion will be due to the chlorinated alkane solvent. Stated in terms of percent by weight, the fluorinated polymeric composition of part II of the definition of the summary will range between about 2 to about 6 percent of the entire emulsion; the wax melamine derivative defined in part III of the summary will range between about 1 and about 4 percent of the entire emulsion; and the sulfonates of part IV of the summary will range between about 0.25 and 1 percent of the entire emulsion. The emulsions of this invention are stable for from 2 to 72 hours or more, and thus may be prepared and employed to impart oil and water repellency to substrates by applying them to fabrics, garments, filaments, fibers, yarns or other articles of a natural, modified natural, or synthetic polymeric material, and other fibrous materials such as paper or leather. Representative examples include cotton, silk, regenerated cellulose, nylon, fiber-forming linear polyesters or acrylonitrile, cellulose nitrate, cellulose acetate, or ethyl cellulose. Especially useful are cotton and cotton-polyester blend fabrics.

The water-in-oil emulsions of this invention can be applied to the above-described substrates by brushing, dipping, spraying, padding, roll-coating, or by any combination of these methods. Pad bath application is preferred, although the emulsion can be employed during normal dry cleaning operations. In pad bath operations, the fibrous material is padded in a bath containing the emulsion of the invention, freed of excess liquid (usually by squeeze rolls) so that the dry pick-up (weight of the dry solids on the fibrous material) is between 0.5 to 0.4 percent based on the original weight of the fibrous material. The treated fabric is then ordinarily air-dried at ambient temperatures and then cured at elevated temperatures, e.g., 165°–195° C., for several, e.g., 2—10, minutes. Of course, different temperatures, higher or lower, and times can be employed depending on the material to be treated and the repellency desired.

The examples which follow illustrate the preparation of the emulsions of this invention and their use for rendering textile fabrics oil and water repellent. It is common practice in the textile field to treat fabrics with several agents simultaneously. These agents may include softeners, anti-static agents, crease-resistant agents, wetting agents, finishes and the like.

In the examples which follow, the treated fabrics are tested for water repellency using A.A.T.C.C. Standard Test Method 22—1952 of American Association of Textile Chemists and Colorists. A rating of 100 denotes no water penetration or surface adhesion, a rating of 90 denotes slight random sticking or wetting, while lower ratings denote increasing water wettability. The treated fabrics in the examples were tested for oil repellency using A.A.T.C.C. Tentative test method 18–1966T. The test comprises placing a drop of Test Solution, described below, on the textile fixed on a horizontal surface. After 2 minutes, any penetration or wicking into the fabric is noted visually. The textile is given a number rating of one to nine in order of increasing oil repellency. Any textile with a rating of five or more is considered to have good oil repellency. Any textile with a rating of one or more can be used for certain oil repellency purposes. The oil repellency rating of the test solutions set forth by the A.A.T.C.C. test are shown as follows:

| Oil Repellency Rating | Test Solution |
| --- | --- |
| 9 | n—Hexane |
| 8 | n—Heptane |
| 7 | n—Octane |
| 6 | n—Decane |
| 5 | n—Dodecane |
| 4 | n—Tetradecane |
| 3 | n—Hexadecane |
| 2 | 50—50 Hexadecane/Nujol |
| 1 | Nujol |

In the following examples, parts are by weight:

Example 1

Preparation of Sulfonate Composition

Into a clean dry enamel or glass-lined reaction vessel equipped with a standard fluorescent illuminating lamp which provides actinic light of wavelengths between about 4,000 A and about 5,800 A was charged 5.76 parts of paraffin wax and 1.0 part of a mixture of highly branched substantially saturated aliphatic hydrocarbons having about 20 to 25 carbons per molecule (preferably Petrolatum Fonoline, which has a melting point of from 49° C. to 55° C.). The temperature was adjusted to 70°±5° C., and with the fluorescent light turned on, and an agitator running, sulfur dioxide and chlorine gases were simultaneously added in the ratio of about 2.7 parts sulfur dioxide to about 1.0 part chlorine. The gases were added as fast as possible while maintaining the temperature at 70° C.±5° C. for the first one-half hour, and at 60° C.±5° C. for the remainder of the gas addition. Cooling is required. As gas addition progressed, samples were removed and tested for their specific gravity at 65° C. When a specific gravity of 0.950±0.003 was obtained, gas addition was stopped. Total usage of gas was about 6.24 parts of sulfur dioxide and about 2.29 parts of chlorine.

A solution was prepared of 3.23 parts 30 percent sodium hydroxide solution and 0.347 part of flaked sodium hydroxide.

It was heated to 70° C.±2° C. and 0.467 part of anhydrous isopropyl alcohol added. The sulfonyl chloride, prepared as described in the preceding paragraph, was added slowly with agitation and cooling to the sodium hydroxide-isopropyl alcohol solution while maintaining the temperature between about 75° C. and 85° C. The mixture was tested during the addition to ensure that the mixture remained alkaline. After addition was complete, the mixture was cooled to about 65° C. and sulfuric acid added until the pH of the mixture was between 5 and 6. This mixture was then bleached by adding portions of 35 percent hydrogen peroxide (total added was about 0.1 to 0.37 part) until the mixture did not change color within one-half hour after peroxide addition. When bleaching was completed, an amount of 30 percent sodium hydroxide solution was added which was sufficient to turn Brilliant Yellow test paper red, but not sufficient to turn red litmus paper blue. 0.0347 part of citric acid was then added and the alkalinity again adjusted as in the preceding sentence. Then 0.0347 part of dichlorodimethyl hydantoin was added and the alkalinity again adjusted as described above. Finally, 0.173 part of borax was added. The aqueous dispersion obtained contained about 75 percent solids in dissolved form.

Example 2

Preparation of Solvent Emulsion

One gram of the aqueous dispersion obtained in Example 1 was added to 175 g. of methyl chloroform. Then with stirring 7.2 g. of a homogenized aqueous mixture containing 27 percent of active ingredient solids, the solids being made up of 46 percent of paraffin wax and 46 percent of the melamine derivative prepared as in Example III of U. S. Ser. No. 470,567, now U.S. Pat. No. 3,480,579, was added, followed by 8.6 g. of the fluorinated polymeric composition described in Table I, No. 1 (prepared by the procedure disclosed in Example VII of U. S. Pat. No. 3,378,609). Sufficient methyl chloroform was then added to make a total composition weight of 200 g. The resulting emulsion was well mixed and showed no signs of settling after standing three hours.

Example 3

Application of Emulsion to Fabric

A piece of cotton poplin (about 8 inches by 18 inches) was dipped in the solvent emulsion of Example 2 and nipped through a wringer to a wet pick up (weight of solvent emulsion retained by the cotton poplin) of 70 percent of the cloth weight. The wet cloth was then air dried at about 70° F. for several hours, and cured on a wooden frame in an air oven at 250° F for 2 minutes. Add-on weight, based on dry untreated cloth, was 0.38 percent sulfonate salts, 0.63 percent wax-melamine derivative and 0.27 percent fluorinated polymeric composition. The treated cloth was tested for its oil and water repellency as described above. Oil repellency rating was 5 and water repellency rating was 70. Untreated cotton poplin tested in the same manner give oil repellency and water repellency ratings of zero.

Example 4

Preparation of Emulsion and Application to Fabric

An emulsion was prepared as described in and using the ingredients of Example 2 except that the fluorinated polymeric composition employed was that described in Table I, Number XII. Cotton poplin was treated with the emulsion as described in Example 3 and tested for water and oil repellency. The cloth had a dry add-on weight of 0.38 percent sulfonate salts, 0.63 percent waxmelamine derivative and 0.41 percent fluorinated polymeric composition. Oil repellency rating was 5 and water repellency was 70.

Example 5

Preparation of Emulsion and Application to Fabric

An emulsion was prepared as described in and using the ingredients of Example 2 except that trichloroethylene replaced the methyl chloroform, 2.8 gms of "Phobotex" f/t/c having the composition described previously, was employed in place of the wax-melamine derivative used therein, and 0.85 gm of catalyst RB (70 parts aluminum glycolate and 30 parts glycolic acid) were added. Cotton poplin was treated as described in Example 3 and tested for oil and water repellency. The cloth had a dry add-on weight of 0.38 percent sulfonate salts, 0.27 percent fluorinated polymeric composition, 1.2 percent "Phobotex" f/t/c and 0.3 percent catalyst RB. An oil repellency rating of 5 and a water repellency of 70 was obtained.

The following cloths were treated in identical emulsions and gave the following oil and water repellency results:

| Cloth | Oil Repellency | Water Repellency |
|---|---|---|
| 65/35 polyester/cotton | 5 | 80 |
| 100% wool flannel | 4 | 80 |
| 100% "Dacron" polyester | 5 | 90 |

Example 6

Preparation of Sulfonate and Emulsion and Application to Fabric

A sulfonate salt composition was prepared generally as described in Example 1 except that the vessel was charged with 1.0 part of the highly branched hydrocarbon described in Example 1 and 2.83 parts of wax eicosane ($C_{20}H_{42}$). Gases employed were 4.57 parts sulfur dioxide and 1.69 parts chlorine, applied at a ratio of 2.7 parts sulfur dioxide to 1.0 part chlorine at a reaction temperature of 42.5° C. Passage of gas was ceased when the specific gravity of the reaction mixture reached 0.918±0.002 at 40° C. The reaction mixture was drowned in a mix of 3.06 parts of 30 percent sodium hydroxide and 0.127 part of ethylene glycol at 87.5° C. The mixture was bleached as in Example 1 and 0.22 part of lauric acid added. The alkalinity was adjusted as described in Example 1 and 0.033 part of dichlorodimethyl hydantoin and 0.035 part of citric acid added.

An emulsion was prepared as described in Example 2 except that the sulfonate described in the preceding paragraph replaced the sulfonates used in Example 2. A 65/35 polyester/cotton and a cotton/rayon upholstery fabric were treated with the emulsion as described in Example 3 and tested for oil and water repellency. Oil repellency was 4 and water repellency was 70 for both fabrics.

Example 7

Preparation of Sulfonate and Emulsion and Application to Fabric

A sulfonate salt composition was prepared by heating 75.9 parts "Sulframin" AB slurry (an aqueous slurry of about 34 percent by weight sodium dodecylbenzenesulfonate, 28 percent isopropyl alcohol and 6.8 percent sodium chloride) to 70°–75° C. with water. Then 11.9 parts anhydrous isopropyl alcohol and 4.3 parts octyl alcohol were added. The pH of the mixture was adjusted to 7.5–8.5 by adding sodium hydroxide and was then allowed to settle at 70°–75° C. The lower, aqueous layer is discarded and the upper layer diluted with water to give about 26–28 percent solids.

An emulsion was prepared as described in Example 2 except that the sulfonates described in the preceding paragraph replaced the sulfonates used in Example 2. A 65/35 polyester/cotton and a cotton/rayon upholstery fabric were treated with the emulsion as described in Example 3 and tested for oil and water repellency. Oil repellency was 4 and water repellency was 70 for both fabrics.

Example 8

Preparation of Emulsions and Application to Fabrics

Four emulsions were prepared as described generally in Example 2 except each contained a different fluorinated polymeric composition, as set forth below, and each contained 5.7 parts of the fluorinated polymeric composition, 7.1 parts of the wax-melamine derivative, and 1.4 parts of the sulfonate salts to make a total of 200 parts of emulsion. The cloths set forth below were treated with the emulsions as described in Example 3 and tested for oil and water repellency. Results are as follows:

| Fluorinated Polymeric Composition of Table I | Oil Repellency 65/35 dacron/ cotton | cotton/ rayon | Water Repellency 65/35 dacron/ cotton | cotton/ rayon |
|---|---|---|---|---|
| I | 4 | 5 | 70 | 70 |
| VI | 1 | 3 | 50 | 50 |
| VIII | 2 | 4 | 70 | 70 |
| IX | 3 | 4 | 80 | 70 |

The preceding representative Examples may be varied within the scope of the present total specification disclosure, as understood and practiced by one skilled in the art, to achieve essentially the same results.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

1. A water-in-oil emulsion comprising
   I. A major amount by weight of a chlorinated alkane solvent containing one or two carbon atoms, said solvent having dispersed therein in emulsified form
   II. from about 1 to about 10 parts by weight of an aqueous dispersion containing about 10 percent to about 25 percent by weight solids, which solids comprise a fluorinated polymeric composition selected from
      a. a fluorinated copolymer consisting essentially of about 25 percent to about 98 percent by weight of units derived from at least one polymerizable fluoromonomer of the structure $CH_2=C(CH_3)CO_2CH_2CH_2(CF_2)_nF$ wherein $n$ is an integer of from 3 to 14, and about 75 percent to about 2 percent by weight of units derived from at least one polymerizable nonhalogenated acrylate or methacrylate ester; or
      b. a polymeric mixture consisting essentially of about 40 percent to about 80 percent by weight of the fluorinated copolymer defined in part I(a) and about 60 percent to about 20 percent by weight of a polymer consisting essentially of units derived from at least one polymerizable nonhalogenated acrylate or methacrylate ester;
   III. from about 1 to about 10 parts by weight of an aqueous dispersion containing about 20 percent to about 30 percent by weight solids, which solids comprise a composition consisting essentially of about 20 percent to about 50 percent by weight wax and about 80 percent to about 50 percent by weight of a melamine derivative comprising the reaction product obtained by treating hexamethylolmelamine with (a) a lower alkyl alcohol in a mineral acid, followed by a $C_{12}$ to $C_{22}$ aliphatic carboxylic acid, or with (b) stearic acid followed by triethanolamine; and
   IV. from about one-half to about 2 parts of an aqueous composition containing about 50 percent to about 75 percent by weight of a sulfonate selected from (a) alkyl ($C_{12}$–$C_{18}$) benzene sulfonate salts, or (b) the sulfonate salts of a mixture of $C_{16}$–$C_{25}$ branched chain hydrocarbons in which the mixture predominates in secondary sulfonates.

2. The emulsion of claim 1 wherein the fluorinated copolymer defined in part II consists essentially of about 60 percent to about 98 percent by weight of units of the polymerizable fluoromonomer and about 40 percent to about 2 percent by weight of units of the polymerizable nonhalogenated acrylate or methacrylate ester.

3. The emulsion of claim 1 wherein in the polymerizable fluoromonomer $CH_2=C(CH_3)CO_2CH_2CH_2(CF_2)_nF$, $n$ represents the numerals 6, 8 and 10 in the approximate weight ratio 3:2:1 and 12 and 14 in a combined amount of less than 10 percent of the total weight due to the fluoromonomer component.

4. The emulsion of claim 3 wherein the fluorinated copolymer defined in part II consists essentially of about 60 percent to about 98 percent by weight of units of the polymerizable fluoromonomer and about 40 percent to about 2 percent by weight of units of the polymerizable nonhalogenated acrylate or methacrylate ester.

5. The emulsion of claim 4 wherein the polymerizable nonhalogenated acrylate or methacrylate ester is selected from a $C_1$–$C_{20}$ alkyl acrylate or methacrylate, hydroxy($C_1$–$C_{20}$)alkyl acrylate or methacrylate, $C_1$–$C_{10}$ acrylamide, $C_1$–$C_{10}$ epoxy acrylate or methacrylate, or mixtures thereof.

6. The emulsion of claim 5 wherein
   1. in the fluorinated copolymer, the units derived from the polymerizable nonhalogenated acrylate or methacrylate are derived from N-methylolacrylamide and 2-hydroxyethyl methacrylate in amounts of about 0.25 percent by weight each, and n-butyl- or lauryl methacrylate present in an amount sufficient to make up the remainder of such units; and wherein
   2. in the polymer consisting essentially of units derived from at least one polymerizable, nonhalogenated acrylate or methacrylate ester, the units are derived from a major amount of 2-ethylhexyl methacrylate and minor amounts of N-methylolacrylamide or ethylene dimethacrylate.

7. The emulsion of claim 6 wherein the melamine derivative is represented by the structure $$\left[ \begin{array}{c} \diagup N \diagdown \diagup N \diagdown \\ N \diagdown \diagup N \diagdown \diagup N \\ \diagup N \diagdown \end{array} \right] \begin{array}{l} (CH_2OR)_x \\ (CH_2O_2R^1)_y \end{array}$$

wherein R is alkyl of 1–6 carbon atoms, $R^1$ is aliphatic hydrocarbon of 12–22 carbon atoms, $y$ is an integer of from 2 to 5, $x+y$ is equal to 6, and $x$ is an integer equal to 6–$y$.

8. The emulsion of claim 1 wherein the sulfonate is a mixture of sodium sulfonate salts of $C_{16}$–$C_{25}$ branched chain hydrocarbons in which the mixture predominates in secondary sulfonates.

9. The emulsion of claim 1 wherein the chlorinated alkane is selected from methyl chloroform, trichloroethylene or perchloroethylene.

10. Process for imparting oil and water repellency to fibrous materials which comprises treating a fibrous material with an emulsion of claim 1 until an amount of emulsion adheres to the material that is sufficient, when dried, to result in a dry pick-up of solids on the fabric of between about 0.5 percent and about 4.0 percent based on the original weight of the material.

* * * * *